Nov. 18, 1947.         H. W. GRAYBROOK         2,431,242
ALTERNATING CURRENT MOTOR CONTROL
Filed Jan. 7, 1944
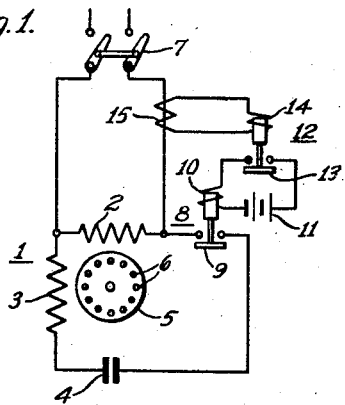
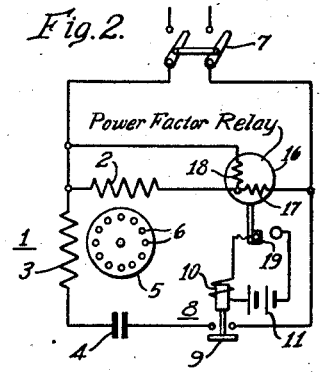
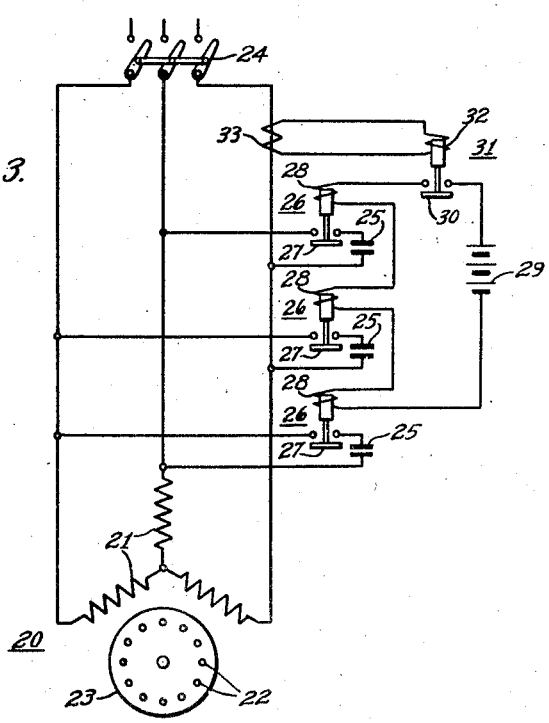
WITNESSES:
INVENTOR
Herbert W. Graybrook.
BY
ATTORNEY Patented Nov. 18, 1947

2,431,242

UNITED STATES PATENT OFFICE 2,431,242

ALTERNATING CURRENT MOTOR CONTROL

Herbert W. Graybrook, Irwin, Pa., assignor to Westinghouse Electric Corporation, East Pittsburgh, Pa., a corporation of Pennsylvania Application January 7, 1944, Serial No. 517,314

2 Claims. (Cl. 318—221)

The present invention relates to alternating-current motors which have a capacitor, or capacitors, connected in the motor circuit, and more particularly to the problem of self-excitation of such motors.

Certain types of single-phase alternating-current motors have a capacitor connected in series with an auxiliary or capacitor winding which is permanently connected in parallel with the main winding of the motor at all times during normal operation. When such a motor is disconnected from the line, it will continue to rotate for an appreciable length of time while coming to a stop, and if the proper inherent relations exist between the constants of the motor circuit, it will function as a self-excited induction generator during this period, the excitation being furnished by the capacitor. This effect is usually of no particular importance in the case of small single-phase motors, such as fractional horsepower motors, but its occurrence may have serious consequences in larger motors. Thus, in the case of a capacitor motor of relatively large size driving a high-inertia load, the motor may continue to rotate for a considerable time. The self-excited generated voltage in the motor during this period may be as much as 180° out of phase with the line voltage, and if the motor is reconnected to the line while it is still rotating, severe electrical and mechanical stresses are set up in the motor which may result in serious damage, such as permanently twisting the motor shaft, or shearing off keys. A similar effect may also occur in the case of polyphase motors with capacitors connected to the motor circuit for power factor correction, or other purposes. The principal object of the present invention is to provide control means for alternating-current motors which have a capacitor, or capacitors, connected to the motor circuit in which operation of the motor as a self-excited induction generator is prevented.

A more specific object of the invention is to provide control means for alternating-current motors having a capacitor, or capacitors, connected to the motor circuit in which the capacitor is disconnected from the motor circuit when the motor is deenergized, and is reconnected to the motor circuit when the motor is again connected to the line.

Further objects and advantages of the invention will be apparent from the following detailed description, taken in connection with the accompanying drawing, in which:

Figure 1 is a schematic wiring diagram showing one embodiment of the invention,

Fig. 2 is a similar diagram showing another embodiment of the invention, and

Fig. 3 is a wiring diagram showing the invention applied to a three-phase motor.

The invention is shown in Fig. 1 applied to a single-phase capacitor motor 1 having a main primary winding 2 and an auxiliary or capacitor primary winding 3, which has a capacitor 4 permanently connected in series with it. The motor 1 also has a rotor member 5 with a squirrel-cage secondary winding 6 on it. The construction and arrangement of the motor 1 may be of any suitable or usual type, and the primary windings 2 and 3 of the motor 1 are connected in parallel to a single-phase supply line by a line switch 7. The motor 1 is to be understood as representing any type of capacitor-run motor, having either a squirrel-cage or wire-wound secondary member, and utilizing either the same value of capacitance for starting and running, or different values.

In the usual construction of capacitor motors of the type described, the capacitor winding is permanently connected in parallel with the main winding, and part or all of the capacitor remains in the circuit at all times. Such a motor, however, may operate as a self-excited induction generator while it continues to rotate after disconnection from the line, as described above, and is subject to the resultant danger of serious damage to the motor or associated equipment if the motor is reconnected to the line while still rotating.

In order to avoid these difficulties, in accordance with the present invention, the capacitor winding 3 and capacitor 4 are controlled by a contactor 8, which has a contact 9 connected in series with the capacitor 4, and an operating coil 10 which may be energized from any suitable source of electric energy, indicated as a battery 11. The contactor 8 is controlled by means of a relay 12 having a contact 13 connected in series with the contactor coil 10, and an operating coil 14. The operating coil 14 of the relay 12 is energized from a current transformer 15 in response to the line current flowing to the motor 1.

It will be seen that when the motor 1 is in normal operation with the line switch 7 closed, the relay 12 will be energized and its contact 13 closed, so that the contactor coil 10 is energized to hold the contact 9 closed, thus connecting the capacitor winding 3 and capacitor 4 across the main winding 2. When the line switch 7 is opened to deenergize the motor, the relay 12 is also deenergized and opens its contact 13, so that the contactor 8 is permitted to open its contact 9 and disconnect the capacitor 4 from the motor circuit. Since the capacitor is thus removed from the motor circuit in response to deenergization of the motor, it is impossible for a self-excited generated voltage to appear in the motor, and the motor can safely be reconnected to the line while still rotating by closing the line switch 7. When the switch 7 is closed, with the motor either stationary or rotating, the current flowing to the winding 2 causes the relay 12 to close its contact 13, thus energizing the contactor coil 10 to close the contact 9 and reconnect the capacitor winding 3 and capacitor 4 in the motor circuit, so that the motor will operate in the normal way. Thus, complete protection is provided against self-excitation of the motor 1, and the danger of severe mechanical and electrical stresses occurring in the motor if it is reconnected to the line while still rotating is avoided.

Fig. 2 shows an alternative embodiment of the invention in which the contactor 8 is controlled by a power-factor relay 16. The relay 16 may be of any suitable type, and has been shown as having a current coil 17 and a voltage coil 18 connected in series with and across the main winding 2, respectively. The relay 16 has a contact 19 which is closed when the voltage and current are in the normal phase relation which exists during operation of the motor. When the line switch 7 is opened to deenergize the motor, a generated voltage appears in the motor windings which is reversed in phase position from the previously applied voltage of the supply line. This reversal in phase position of the voltage across the main winding 2 causes the relay 16 to open its contact 19, and thus to deenergize the contactor coil 10 so that the capacitor winding 3 and capacitor 4 are disconnected from the motor circuit. When the line switch 7 is closed to reconnect the motor to the line, the relation of the applied voltage and the current is such that the relay 16 closes its contact 19, and causes the contactor 8 to reconnect the capacitor winding 3 and the capacitor 4 in the motor circuit. It will be apparent that the general operation and advantages of this embodiment of the invention are the same as those of the embodiment shown in Fig. 1, and that the embodiment of Fig. 2 differs only in using a power-factor-responsive relay rather than a current-responsive relay.

It is fairly common practice to connect capacitors across the windings of polyphase motors to improve the power factor, or for other reasons, and when such capacitors are connected directly across the motor windings, as is often done in the case of motors in industrial plants, for example, the same danger of self-excitation of the motor upon disconnection from the line exists as discussed above in connection with single-phase motors, and the present invention is also applicable to the prevention of this effect in polyphase motors.

Fig. 3 shows the invention applied to a three-phase induction motor 20 having three-phase primary windings 21 and a squirrel-cage secondary winding 22 carried on a rotor member 23. The motor 20 may be any usual type of polyphase electric motor, although a squirrel-cage induction motor has been shown for the purpose of illustration. The motor 20 is connected to a three-phase supply line by means of a line switch 24, and a capacitor 25 is connected across each phase of the motor winding. This is a common arrangement for improving the power factor. In order to prevent the possibility of self-excitation of the motor 20 when it is disconnected from the line, each of the capacitors 25 is controlled by a contactor 26 having a contact 27 connected in series with the capacitor. Each of the contactors 26 has an operating coil 28, and the operating coils 28 of all the contactors are arranged to be simultaneously energized from any suitable source of electric energy, such as a battery 29. As shown in the drawing, all three coils 28 are connected in series and their energization is controlled by the contact 30 of a relay 31. It will be understood, of course, that the contactor coils 28 could equally well be connected in parallel, the essential requirement being that they shall be substantially simultaneously energized and deenergized. It will also be apparent that a single contactor could be used having separate contacts for each of the capacitors 25. The relay 31 has a coil 32 which is supplied from a current transformer 33 connected in series in one of the three-phase leads supplying the motor 20.

It will be apparent that the operation of the embodiment of the invention shown in Fig. 3 is substantially the same as that of the circuit of Fig. 1. Thus, in normal operation of the motor, the contact 30 of the relay 31 is held closed by reason of the current flow to the motor which energizes the coil 32 through the current transformer 33. The coils 28 of the contactors 26 are thus connected to the power source 29 and hold their contacts 27 closed so that the capacitors 25 are connected across the motor windings 21. When the switch 24 is opened to deenergize the motor 20, the flow of current through the transformer 33 is interrupted and the relay contact 30 opens, deenergizing the contactor coils 28 and permitting the contactors 26 to open their contacts 27 and disconnect the capacitors 25 from the motor. Thus, the possibility of self-excitation of the motor 20 is prevented, and the switch 24 can be reclosed while the motor is still rotating without danger of any damage to the motor resulting. Upon reclosure of the switch 24, the relay 31 recloses its contact 30, causing the contactors 26 to again connect the capacitors 25 to the circuit.

It should now be apparent that control means have been provided for alternating-current motors, either single-phase or polyphase, which have a capacitor, or capacitors, connected to the motor circuit, which positively prevents the possibility of self-excitation of the motor while it is still rotating after being disconnected from the line, and thus the danger of either mechanical or electrical damage to the motor is avoided. It is to be understood that the invention is capable of various modifications and embodiments and that the three specific embodiments shown are only illustrative. Thus, in some cases where the currents involved are not too great, the contacts of the relays 12 or 16 might be connected directly in the capacitor circuit instead of controlling a contactor. Similarly, the arrangement and connections of the relays may be varied, and other types of relays might be used for the purpose of automatically effecting disconnection of the capacitor in response to deenergization of the motor.

It will be apparent, therefore, that the invention is capable of various modifications and embodiments within the scope of the broad principles of the invention, and it is to be understood that although certain specific embodiments have been shown and described for purposes of illustration, the invention is not limited to these particular embodiments but in its broadest aspects it includes all equivalent embodiments and modifica-

I claim as my invention:

1. A single-phase alternating current electric motor having a main primary winding and an auxiliary primary winding, a capacitor, means for connecting said capacitor in series with said auxiliary primary winding at all times during normal operation of the motor, and means responsive to the phase relation between motor current and motor voltage for effecting disconnection of the capacitor from the motor in response to a reversal in phase position of said voltage.

2. A single-phase alternating current electric motor having a main primary winding and an auxiliary primary winding, a capacitor, means for connecting said capacitor in series with said auxiliary primary winding at all times during normal operation of the motor, and relay means responsive to the phase relation between motor current and motor voltage for effecting disconnection of the capacitor from the motor in response to reversal in the relative phase position of said current and voltage.

HERBERT W. GRAYBROOK.

REFERENCES CITED

The following references are of record in the file of this patent:

UNITED STATES PATENTS

| Number | Name | Date |
|---|---|---|
| 732,822 | Bradley | July 7, 1903 |
| 1,239,979 | Steinmetz | Sept. 11, 1917 |
| 2,136,863 | Owen | Nov. 15, 1923 |
| 513,349 | Rice | Jan. 23, 1894 |
| 2,078,667 | Kado | Apr. 27, 1937 |
| 1,991,040 | Werner | Feb. 12, 1935 |
| 2,262,417 | Wolfert | Nov. 11, 1941 |
| 2,039,050 | Ball | Apr. 28, 1936 |

FOREIGN PATENTS

| Number | Country | Date |
|---|---|---|
| 25,677 | France | Jan. 23, 1923 |
| 182,876 | Great Britain | July 3, 1922 |
| 473,492 | Great Britain | Oct. 14, 1937 |
| 602,010 | France | Dec. 16, 1925 |